Nov. 19, 1929. S. A. MEYERS Re. 17,493
SNAP SWITCH
Original Filed July 15, 1926 2 Sheets-Sheet 1
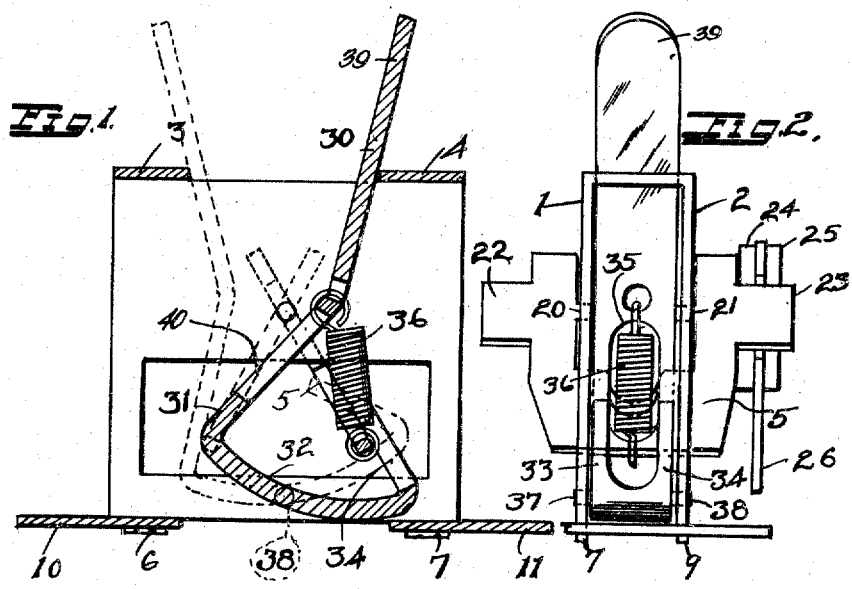
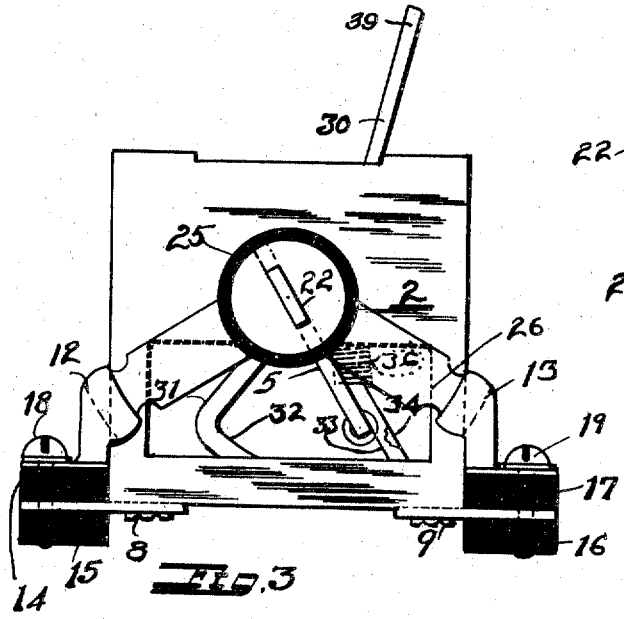
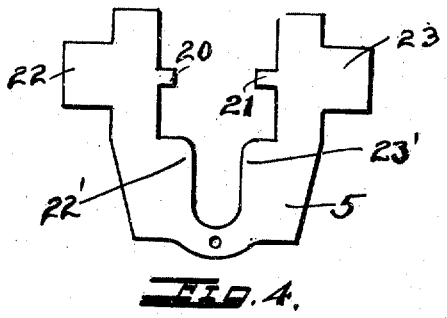
INVENTOR.
Samuel A. Meyers.
BY
Carlos P. Griffin
ATTORNEY.

Nov. 19, 1929.

S. A. MEYERS

SNAP SWITCH

Re. 17,493

Original Filed July 15, 1926

2 Sheets-Sheet 2

INVENTOR.
Samuel A. Meyers.
BY
Carlos P. Griffin
ATTORNEY.

Reissued Nov. 19, 1929

Re. 17,493

UNITED STATES PATENT OFFICE

SAMUEL A. MEYERS, OF SAN FRANCISCO, CALIFORNIA, ASSIGNOR TO PARAMOUNT ELECTRIC MFG. CO., A CORPORATION OF CALIFORNIA

SNAP SWITCH

Original No. 1,664,380, dated March 27, 1928, Serial No. 122,518, filed July 15, 1926. Application for reissue filed December 5, 1928. Serial No. 324,023.

This invention relates to a snap switch, and an object thereof is to produce such a switch in as simple construction as possible, consistent with the complicated action necessary to comply with the demands of standard electrical service requirements, connections and wiring.

An object of the invention is to produce a strong construction with only three movable parts, the spring, the handle, and the contact knife supporting plate.

Another object of the invention is to provide a pivoted handle positively supported and a positive support for the knife carrying member, each with its own integral pivots.

Another object of the invention is to provide a quick acting knife switch capable of being made in large or small sizes which will have its spring so placed as to hold the operating handle securely in either position to which it may be moved, the operating handle itself carrying means to determine the amount of movement of the knife carrying member on each throw.

Another object of the invention is to provide the supporting side frame plates with suitable openings through which the knife carrier and operating handle can be easily assembled, the final assembly being in such form as to insure permanence.

Another object of the invention is to provide a form of operating handle which will be capable of positively disconnecting the knife contacts from the fixed contacts even if the spring is broken, and which handle is also capable of assisting the knife carrying plate in moving toward the connected position, but which cannot finally connect the movable knife contacts with the fixed contacts unless the spring is in perfect condition.

Another object of the invention is to provide the switch handle with a sufficiently long leverage to make the operation of large capacity switches easy, the spring simply acting to quicken the action after disengagement of the movable knives with the fixed contacts.

It will also be seen that the operating handle acts on the knife carrier at a radius substantially equal to the radius of the point of applied friction of the fixed contacts from the knife carrier pivot, and therefore the handle has a very considerably multiplied leverage with respect to the knife carrier thus making it possible to disengage the knife contacts even though they may be considerably corroded.

Other objects of the invention will appear as the description proceeds.

An embodiment of the invention is shown in the accompanying drawings in which the same reference numeral is applied to the same portion throughout, but I am aware that there may be modifications thereof.

Figure 1 is a side view of the operating parts of the switch with the frame in vertical section, and with one side of the knife supports cut away, Figure 2 is an end elevation of the frame and movable parts of the switch without the contacts, Figure 3 is a side elevation of the switch showing one knife applied and its two complementary contacts.

Figure 4 is a plan view of the knife carrying plate

Figure 5:
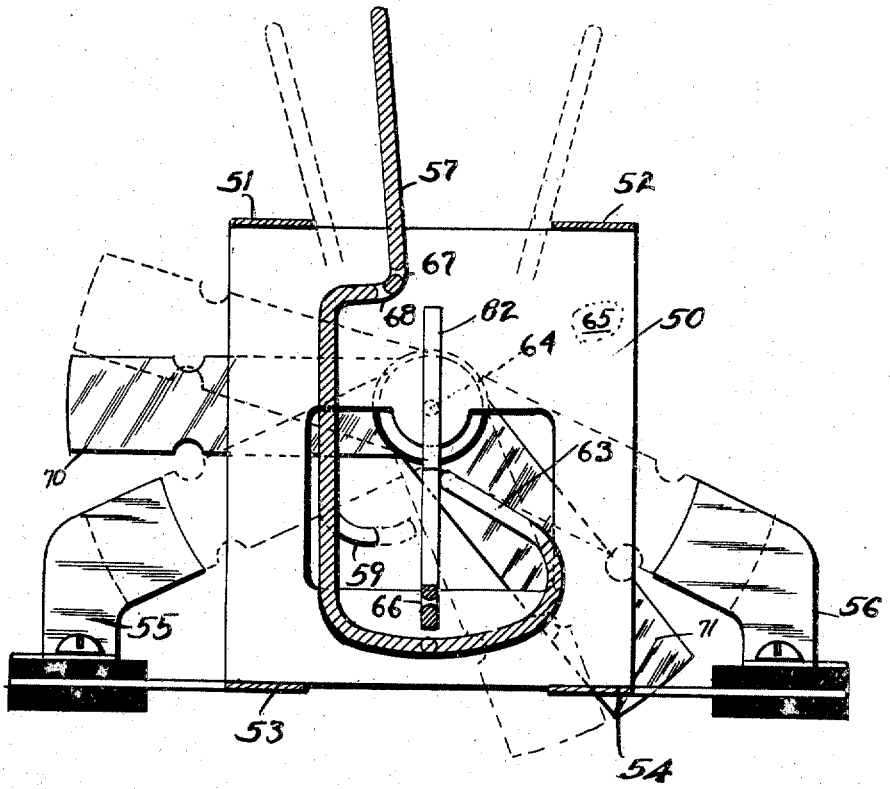
Figure 5 is a view partly in section, showing a large size switch, the dotted lines indicating the limit position of the operating handle, the illustration being for the purpose of showing the operation of the handle, in disengaging the blades and in starting the movement of the knife carrying blade.

The frame of the switch consists of a steel plate bent into an inverted U shape having the sides 1 and 2 with the two connecting top portions 3 and 4. At the lower portion of each side plate there is a long rectangular opening through which the knife holder 5 passes.

The lower edges of the plates 1 and 2 are connected in any suitable manner, usually by riveting as shown at 6, 7, 8 and 9 to two plates 10 and 11 which are wide enough to form a support for the fixed contacts 12 and 13, on both sides of the two sides 1 and 2. The contacts are all held in place by the insulated strips 14 to 17, and by the screws 18 and 19 which latter, of course, do not touch the plates 10 and 11.

The knife carrier 5 consists of a heavy flat plate cut somewhat U-shaped with two inwardly projecting pivots 20 and 21 and with two outwardly extending knife carrying lugs 22 and 23, said lugs passing through two insulating washers 24 and 25 to support and carry a knife 26 on each side of the frame. The knife has its blades at such an angle to each other that each will move the required distance away from the contacts 12 and 13 and, this means that the latter contacts are just twice that distance from each other. Now it will be seen that as the plate 5 is outside the plates 1 and 2 and that they must be pressed in above the rectangular openings to allow the pivots 20, 21 to enter their holes in said plates. This assembly is effected before the bottom plates are secured in place.

The operating handle 30 has three bends to provide the members 31, 32 and its lower end is slotted to provide the two forks 33 and 34, said member 31 is also slotted as shown at 35 to allow for the movement of a small spiral spring 36 which causes the rapid operation of the knife contacts and which securely holds the handle and knife carrier in either position.

It will be seen that the two prongs 33—34 bear upon the knife carrying plate at the point 22′—23′ when the knives are in the contact position and when they are to be disengaged, said prongs slide along the plate 5 at these points to cause the disengagement while in the opposite position the hand lever at the point designated 40 in Figure 1 will bear upon the shoulders 22′—23′ to push the knife holding plate a portion of the distance towards the engaged position. The same results are obtained with the form of handle shown in Figure 5 by the two forks 63, the two lugs 59 in starting the movement of the knife carrying plate in both directions.

The member 32 has the two integral pivots 37, 38 substantially aligned with the handle 30, and as these pivots extend outwardly it is necessary to press the lower webs of the plates 1 and 2 outwardly to engage them in their holes, and this is easily possible because of the length of the lower web and that must be done before the base plates are riveted in place. The projecting part 39 of the handle 30 affords a grip portion for convenient manual operation and since this end is the force-receiving portion, the operating handle as a whole may be considered as a lever of the second class.

The operation of the switch is as follows: When the handle is moved in either direction it will positively push the knife carrying plate in the corresponding direction. If the knife contacts are engaged the arms 33—34 will push on the plate until the knives actually leave the fixed contacts whereupon the spring will snap the knives to the disengaging position with the holder 5 against the member 31, in the opposite position the member 31 will push on the plate 5 enough to start it and will push it over the center whereupon the spring 36 will snap the knives into position between the fixed contacts, but if the spring is broken the knives cannot be pushed into position against the fixed contacts as will be apparent from an examination of the construction illustrated in Figure 5.

In the construction shown in Figure 5 a larger form of switch is illustrated with only one side plate being shown. In this figure the numeral 50 indicates one side plate. This plate is suitably connected to the other side plate by the two members 51—52 at the top and at the bottom and is connected to the two plates 53—54 which carry the insulated fixed contacts 55—56. The handle 57 is movable between the side plates precisely as in the previous form of the invention from the edge of the connecting plate 51 to the connecting plate 52, and instead of being bent as shown in Figure 1 it is provided with the integral lugs 59 to push against the knife carrying plate 62 on one side, while it has two arms 63 to push against the knife carrying plate, on the other side. The knife carrying plate has two pivots 64—65 the same as the plate shown in Figure 4 and it is provided with a hole at 66 to which the spring may be connected.

The handle 57 is also provided with holes at 67—68 to allow the spring to be connected at its other end. Only one of the knife contacts is shown secured to the plate 60 its arms appearing at 70—71. It will be apparent from the solid line position of the arms 63 that the handle movement is sufficient to disengage the knives 70—71 from the fixed contacts 55—56, and it will also be apparent from the dotted line position of 59 that it will be impossible for that lug to engage the knives 70—71 with the fixed contacts 55—56 unless the spring is intact and in perfect working condition.

What I claim is as follows, but modifications may be made in carrying out the invention shown in the drawings and in the above particularly described form thereof, within the purview of the invention, as defined by the annexed claims.

I claim:

1. In a switch for electric circuits comprising a frame, electric contacts carried thereby, a pivotally mounted knife carrier, a handle pivotally carried by the frame, and a spring connecting the knife carrier and handle to cause both of them to be resiliently held in opposite positions, said handle being shaped to start the knife carrier and to stop it in opposite movements thereof.

2. In a switch for electric circuits comprising a frame, insulated electric contacts carried thereby, a pivotally mounted knife carrier, a handle pivotally carried by the frame, means on the handle to push the knife carrier in either direction, means on said handle to limit the movement of said knife carrier in both directions, and a spring connecting the knife carrier and handle to hold the knife carrier and handle in either position, said handle and knife carrier being permanently held in place in the frame independent of the spring.

3. In a switch for electric circuits, a frame, insulated electric contacts carried thereby, a pivotally mounted knife carrier, a handle, pivots for said handle extending into the frame at a point opposite the operative end of the handle and from the pivot point of the knife carrier, means on the handle to push the knife carrier in either direction, means on said handle to limit the movement of said knife carrier, and a spring connecting the handle and knife carrier whereby both of them are held in either position.

4. A switch for electric circuits comprising a frame, having two flat sides, a knife carrier pivotally mounted in said frame with its pivots extending inwardly, an operating handle extending into said frame with its pivots extending outwardly, means on said handle to push the knife carrier in either direction when engaged or disengaged, means on said handle to limit the movement of said knife carrier, and a spring connecting them to hold the handle and knife carrier resiliently in either position.

5. A switch for electric circuits comprising a rectangular frame having flat sides, a knife carrier extending through the frame, and embracing it, electric contacts which may be connected by said knife carrier, a handle extending into said frame with pivots extending outwardly therethrough, means on the handle to operate the knife carrier in either direction, said handle also being shaped to stop the knife carrier at the end of both of its movements, and a spring for resiliently holding the knife carrier and handle resiliently in opposite positions, both the handle and the knife carrier being pivoted to the frame permanently independently of the spring.

6. A switch for electrical circuits comprising a frame having openings through which a knife carrier swings, insulated electric contacts carried thereby, a pivotally mounted knife carrier, a handle, pivots for said handle extending through the frame at a point opposite the operative end of the handle, means on the handle to positively disengage the knife from the fixed contacts, means on the handle to positively move the knife toward the fixed contact but incapable of engaging the knife therewith, a spring for completing the movement of the knife carrier in both directions, and means on said handle to limit the movement of said knife carrier both ways.

7. A switch for electrical circuits comprising a frame, insulated electric contacts carried thereby, a pivotally mounted knife carrier, a handle, pivots for the knife carrier and handle extending into the frame, a spring connected to the knife carrier and handle to hold both of them in opposite positions, and means on the handle to limit the knife carrier movement in both directions.

8. A switch for electrical circuits comprising a frame, insulated electric contacts carried thereby, a pivotally mounted knife carrier, a handle, pivots for both of said members extending into the frame, means on the handle to positively start the movement of the knife carrier in opposite directions and capable of limiting the movement of said carrier, and a spring for completing the movement of the knife carrier in both directions.

9. A switch for electrical circuits comprising a rectangular frame, fixed insulated electric contacts carried thereby, a pivotally mounted knife carrier, an operating handle, pivots for both of said members extending into the frame, means on the handle to positively disengage the knife from the fixed contacts, other means on the handle to positively move the knife toward the fixed contacts, but incapable of engaging the knife therewith, both of said members acting as limiting stops for the movement of the knife carrier, and a spring connecting the knife carrier and handle to complete the movement of the knife carrier in both directions.

10. A switch for electric circuits comprising a frame provided with parallel sides having registered openings, a knife carrier pivotally mounted in said frame and adapted to swing across said openings in the frame, insulated electric contacts carried by the frame, a contact knife mounted on the knife carrier, an operating handle pivotally mounted in said frame adapted to swing across the pivot point of the knife carrier, said handle being shaped to start the movement of the knife carrier from each of its end positions and also adapted to stop the knife carrier at both end positions, and a spring connecting the knife carrier and handle to increase the rapidity of action of the knife carrier, said knife carrier and said handle crossing each other in opposite directions from their pivots and opposite positions whereby the spring securely holds the knife carrier and handle in each of their end positions.

11. A snap switch comprising a frame, an operating handle movable between two extreme positions and having a cam surface between its ends, a force receiving portion at one end of said handle, means for pivotally mounting the other end of said handle in said frame, a knife carrier movable between two extreme positions and having a cranked portion substantially confined by and adapted to contact said cam surface, means for pivotally mounting said knife carrier in said frame between the ends of said operating handle, and means biasing said handle and said carrier to corresponding extreme positions.

12. A snap switch comprising a frame, an operating handle having a force receiving portion at one end, means for pivotally mounting the other end of said handle in said frame, said handle being formed between its ends to provide an arcuate cam surface, a knife carrier movable between two extreme positions and having a cranked portion substantially confined by and adapted to contact said cam surface, means for pivotally mounting said knife carrier in said frame between the ends of said operating handle, and means biasing said handle and said carrier to corresponding extreme positions.

13. A switch for electric circuits comprising a frame, a knife carrier operatively mounted and movable between two extreme positions in said frame, and a handle operatively positioned in said frame and movable between two extreme positions, said handle having a cam surface between its ends, one portion of said cam surface contacting with said knife carrier to urge said carrier toward the opposite of said extreme positions and an opposite portion of said surface contacting with said carrier to limit the movement thereof.

14. A knife switch comprising a frame, a knife carrier mounted to pivot in said frame, an actuating lever curved between its ends partially to encompass said knife carrier, means for pivotally mounting one end of said lever in said frame, a force receiving portion on the other end of said lever, and a spring for transmitting pivotal movement of said lever to said knife carrier.

15. A switch including a frame, a knife carrier rotatably mounted in said frame, means for rotating said carrier between two extreme positions, said means comprising a lever pivotally mounted at one end thereof and having a force receiving portion adjacent the other end, said lever being formed between its pivotal mounting and its force receiving portion substantially to encompass a space for containing said knife carrier, and a spring lying in said space and connecting said carrier and said rotating means together.

16. A switch including a frame, a knife carrier mounted to rotate with respect to said frame, means for rotating said carrier, said means comprising a member substantially encompassing said carrier, said member being mounted at one end thereof for pivotal movement with respect to said frame and having a force receiving portion adjacent the other end thereof, and a spring joined to said member adjacent to said force receiving portion and to said knife carrier.

In testimony whereof, I have hereunto set my hand.

SAMUEL A. MEYERS.